UNITED STATES PATENT OFFICE.

CON DRISCOLL, OF COALINGA, CALIFORNIA, ASSIGNOR TO FRANK PREVOST, OF COALINGA, CALIFORNIA.

PROCESS OF MAKING A FOOD COMPOUND.

1,028,005. Specification of Letters Patent. Patented May 28, 1912.

No Drawing. Application filed August 5, 1911. Serial No. 642,512.

*To all whom it may concern:*

Be it known that I, CON DRISCOLL, a citizen of the United States, residing at Coalinga, county of Fresno, State of California, have invented a new and useful Process of Making a Food Compound to be Used as a Food, in the Preparation of Foods, and in the Preparation of Drinks.

My composition consists of the following ingredients, combined in the proportions stated, viz:

| | |
|---|---|
| Fresh egg | $5\frac{1}{2}$ ounces. |
| Granulated sugar, cane or beet | 12 ounces. |
| Fresh whipped cream | $1\frac{1}{2}$ ounces. |

These ingredients are thoroughly mingled by agitation.

In preparing the above composition the following process is followed: The yolk of egg is first thoroughly beaten or whipped and placed in a receptacle used for the purpose; to this is added so much of the sugar as will be absorbed or taken up by the yolk of egg, and the whole thoroughly mingled; the well beaten white of egg is then added and mingled, together with so much of the sugar as may be absorbed or taken up by the added white of egg; to this is then added the whipped cream and the whole thoroughly mingled while the balance of sugar is being added, the latter being so much as may be absorbed or taken up by the cream. As a result of so much mingling and agitation the said composition is caused to foam, or become foamy. No ferment is used in this composition. The composition is then set aside and left undisturbed until such time as it has receded, settled and lost its foamy appearance when it is again thoroughly agitated, and so on, until such time as it becomes thoroughly dry by evaporation. In a warm dry climate the composition will dry readily, but under certain climatic conditions artificial heat must necessarily be applied to perfect the drying process. After the composition becomes thoroughly dry it is then ready to be crushed or pulverized as may be desired, and is ready for use. When used in the preparation of food it is used in the form of a powder, and when used in the preservation of foods or as a food itself, it is used in a coarser form.

In using the above composition in pastry, two tablespoons of the said composition should be used where one egg would ordinarily be used. For example: One baking a cake for which the use of four eggs is prescribed, would use instead eight tablespoons of the above composition; the said composition would, as intended, supply the pastry with the necessary sugar, cream and eggs; and in the preparation of drinks, so much is used as is deemed necessary, or to suit the taste.

I am aware that the said ingredients are used in foodstuffs, but I am not aware that the said ingredients are used together, and exclusively, and as a preparation or single ingredient in itself in the preparation of any food or composition of matter for which patent is issued; nor am I aware that my peculiar process of preparing the said composition has ever been used or patented.

I claim:

1. The herein described process for preparing a food compound, consisting in first thoroughly beating the yolks of eggs, and adding as much sugar as said yolks will absorb; second thoroughly whipping the whites of eggs and adding as much sugar as said whites will absorb; third mixing the aforementioned ingredients together, adding whipped cream thereto and also as much sugar as will be absorbed thereby; then leaving the composition undisturbed until it has lost the froth due to whipping, and in thoroughly agitating and whipping the same, until the mass becomes dry.

2. The herein described process for preparing a food compound which is as follows: the yolk of egg is first thoroughly beaten or whipped, and placed in a receptacle used for the purpose; to this is added so much of the sugar as will be absorbed or taken up by the yolk of egg, and the whole thoroughly mingled; the well beaten white of egg is then beaten and mingled, together with so much of the sugar as may be absorbed or taken up by the added white of egg; to this is then added the whipped cream, and the whole mingled while the balance of sugar is being added; the composition is then set aside and left undisturbed until such time as it has receded, settled, and lost its appearance of fermentation when it is again thoroughly agitated, and so on, until such time as it becomes thoroughly dry by evaporation, or the application of artificial heat when required to effect the dryness.

CON DRISCOLL.

Witnesses:
FRANK PREVOST,
B. W. KILBY.